United States Patent
Enickl et al.

(10) Patent No.: US 10,849,305 B2
(45) Date of Patent: Dec. 1, 2020

(54) SYSTEM AND METHOD FOR EVALUATING A CLEANING PROCESS IN RESPECT OF A MILK TRANSPORTING CONDUIT STRUCTURE

(71) Applicant: DELAVAL HOLDING AB, Tumba (SE)

(72) Inventors: Jörgen Enickl, Tumba (SE); Kim Landholm, Tumba (SE); Anders Westman, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 322 days.

(21) Appl. No.: 15/779,041

(22) PCT Filed: Nov. 7, 2016

(86) PCT No.: PCT/SE2016/051093
§ 371 (c)(1),
(2) Date: May 24, 2018

(87) PCT Pub. No.: WO2017/091126
PCT Pub. Date: Jun. 1, 2017

(65) Prior Publication Data
US 2018/0352779 A1 Dec. 13, 2018

(30) Foreign Application Priority Data
Nov. 27, 2015 (SE) ...................................... 1551540

(51) Int. Cl.
*A01J 7/02* (2006.01)
*A01J 5/007* (2006.01)

(52) U.S. Cl.
CPC ............... *A01J 7/022* (2013.01); *A01J 5/007* (2013.01)

(58) Field of Classification Search
CPC .................................. A01J 5/007; A01J 7/022
USPC .......... 702/50, 51, 47, 81; 119/14.15, 14.46; 134/57 R
See application file for complete search history.

(56) References Cited

U.S. PATENT DOCUMENTS

| | | | |
|---|---|---|---|
| 5,896,828 A | 4/1999 | Kronschnabel et al. | |
| 6,089,242 A | 7/2000 | Buck | |
| 7,957,920 B2 | 6/2011 | Innings et al. | |

(Continued)

FOREIGN PATENT DOCUMENTS

| | | |
|---|---|---|
| JP | 2012-005421 A | 1/2012 |
| WO | 03/106934 A1 | 12/2003 |

OTHER PUBLICATIONS

Reinemann et al., "Two-Phase Cleaning Flow Dynamics in Air Injected Milklines", 1994, pp. 1531-1536, vol. 37, No. 5.

(Continued)

*Primary Examiner* — John H Le
(74) *Attorney, Agent, or Firm* — Nixon & Vanderhye

(57) ABSTRACT

The cleaning of milk transporting conduit structure involves introducing fluid and an amount of gas into the milk transporting conduit structure, which causes a slug of fluid to be formed in and forwarded through the milk transporting conduit structure. A sensor arrangement measures at least one parameter related to the slug, and repeatedly forwards updatings of the at least one measured parameter to the data processor. Based thereon, the data processor produces an indicator of at least one quality of the cleaning process. The indicator reflects a cross-sectional profile of the slug at at least one position in the milk transporting conduit structure.

34 Claims, 2 Drawing Sheets

(56) References Cited

U.S. PATENT DOCUMENTS

2010/0154715 A1 6/2010 Persson et al.
2010/0252119 A1 10/2010 Westman et al.
2011/0041770 A1 2/2011 Westman et al.
2015/0296736 A1 10/2015 Cattaneo et al.

OTHER PUBLICATIONS

International-Type Search Report, dated Jun. 15, 2016, from corresponding SE application No. 1551540-6.
International Search Report, dated Feb. 16, 2017, from corresponding PCT application No. PCT/SE2016/051093.
Written Opinion, dated Feb. 16, 2017, from corresponding PCT application No. PCT/SE2016/051093.
Office Action issued in Japanese Patent Application No. 2018-516681 dated Jun. 12, 2020 with English translation provided.
Reinemann et al., "Airflow Requirements, Design Parameters and Troubleshooting for Cleaning Milking Systems," Proceedings, ASAE/NMC Dairy Housing Conference, Jan. 31-Feb. 4, 1994, Orlando, Florida, USA.

SYSTEM AND METHOD FOR EVALUATING A CLEANING PROCESS IN RESPECT OF A MILK TRANSPORTING CONDUIT STRUCTURE

THE BACKGROUND OF THE INVENTION AND PRIOR ART

The present invention relates generally to the cleaning of milking equipment. More particularly the invention relates to a system and a corresponding method. The invention also relates to a computer program and a processor-readable medium.

For sanitary and health reasons it is highly important that all equipment used in automated milking are cleaned regularly and that this cleaning satisfies certain quality conditions. From a cost point-of-view it is also important that adequate cleaning can be effected with minimal disruption in the milk extraction.

The prior art includes some examples of solutions for testing and evaluating milking machines and milking installations. For example, U.S. Pat. No. 7,957,920 shows a system for dynamic/wet testing of a milking machine. Here, a testing arrangement includes sensors which are adapted to register a vacuum pressure at a respective test point in at least one fluid conduit of the milking machine. An analysis unit determines at least one pressure difference between the vacuum pressures registered in at least two of the test points being positioned on a respective side of at least one component in the milking machine with respect to a fluid flow through the at least one component to establish a vacuum drop over this component. The analysis unit compares the vacuum drop with a threshold value to conclude whether or not a test condition is fulfilled. A notification is generated with respect to any component for which the condition not is fulfilled. Thus, for instance an appropriate corrective action can be carried out.

U.S. Pat. No. 6,089,242 discloses a dairy pipeline wash system for monitoring and controlling the wash cycle of a dairy harvesting facility including a user interactive data processor for receiving and storing wash parameters, monitoring wash conditions, comparing monitored wash conditions to wash parameters, and controlling wash conditions to comply with wash parameters. The dairy pipeline wash system may include a closed loop or fuzzy logic system to vary wash conditions as dairy pipeline conditions change.

US 2015/0296736 describes a computer implemented method for the control of the milking operations of automated systems, which method includes: measuring the pressure in the vacuum line of the milking system; recording and storing pressure-measurement data as a function of time and construction of a related plot; comparison and processing of data acquired and stored with pre-set values and classification of milking events; display of milking events and alarm signalling on local or remote operator interfaces; in which an interaction with vacuum generation and regulation devices of said milking system occurs in response to a command given by the processing and the determination of an operational event in progress on the milking system, said operational event being determined by the comparison and correlation of the continuously measured pressure values of said pressure plot with values measured during pressure fluctuations recorded at moments preceding and following the change of said plot.

Problems Associated with the Prior Art

Although the known solutions for testing and evaluating may be useful for many purposes they do not address some of the aspects that are important for determining how well a cleaning process is performed.

SUMMARY OF THE INVENTION

The object of the present invention is therefore to offer an improved analyzing tool for evaluating the cleaning process in respect of a milk transport conduit structure.

According to one aspect of the invention, the object is achieved by the initially described system, wherein the indicator produced by the data processor reflects a cross-sectional profile of the slug at at least one position in the milk transporting conduit structure. Moreover, the sensor arrangement is configured to repeatedly forward updatings of the at least one measured parameter to the data processor. The slug is here a volume of fluid filling the entire cross section of a conduit in the milk transporting conduit structure, and which volume has a relatively short extension along the conduit.

The sensor arrangement may include at least a pressure sensor, an ultra sound sensor, an electromagnetic sensor or an optical sensor or any sensor that can measure at least one parameter related to the slug. The data processor that is configured to receive the at least one parameter measured by the sensor arrangement has to be able to produce an indicator based on the parameter and the indicator reflects a cross-sectional profile of the slug at at least one position in the milk transporting conduit structure.

This system is advantageous because it enables qualified evaluation as well as accurate illustration of the most important characteristics of the slug. Thus, a solid basis is provided for determining whether or not the milk transporting conduit structure has been sufficiently cleaned. A reliable quality measure of this type is advantageous because it renders possible guaranteeing a high cleaning efficiency. Consequently, unnecessary overuse of detergents and energy can be avoided.

According to a preferred embodiment of this aspect of the invention, the indicator produced by the data processor includes graphical data expressing how the slug is distributed in the milk transporting conduit structure as a function of time and/or length along the milk transporting conduit structure. Based on the graphical data, in turn, an operator may visually assess if the slug's characteristics were such that it was likely to be successful in cleaning the milk transporting conduit structure. An algorithm may also be applied to the graphical data in order to automatically categorize the slug as successful or not. For example, according to one preferred embodiment of this aspect of the invention, the data processor is configured to assign a quality level to the slug based on at least one slope criterion with respect to the cross-sectional profile of the slug at at least one position in the milk transporting conduit structure. Further preferably, the at least one slope criterion relates to a leading edge and/or a trailing edge of the slug.

According to another preferred embodiment of this aspect of the invention, the data processor is configured to, based on the repeated updatings of the at least one measured parameter, determine: a cross-sectional length of the slug defined as a distance of the milk transporting conduit structure being fully filled by the slug; and/or an extension in time of the slug defined as an interval during which the slug fully fills the cross section of the milk transporting conduit structure at a particular position. Consequently, unambiguous measures of the slug's key properties can be stored for evaluation. A good cleaning result is related to the contact between the slug and the milk transporting conduit structure.

According to a further preferred embodiment of this aspect of the invention, the fluid inlet is associated with a controllable valve which is configured to cause a particular amount of fluid to be introduced into the milk transporting conduit structure before the injector introduces the amount of gas into the milk transporting conduit structure. Hence, the slug size can be controlled conveniently.

According to yet another preferred embodiment of this aspect of the invention, the sensor arrangement includes at least one pressure sensor configured to register a pressure level inside the milk transporting conduit structure. Thus, the most important characteristics of the slug can be measured in a reliable manner.

Further preferably, the sensor arrangement contains first and second sensors. Here, the first sensor is configured to measure a first parameter at a first measurement point in proximity to and downstream of the injector relative to a flow direction for the slug. The second sensor is configured to measure a second parameter at a second measurement point downstream of the first measurement point on the milk transporting conduit structure. The data processor is configured to produce the indicator based on the first and second parameters so as to reflect the cross-sectional profile of the slug at the first and second measurement points respectively. Thereby, conclusions can be made inter alia concerning an average speed of the slug and/or how the slug is transformed while passing through the milk transporting conduit structure.

According to another preferred embodiment of this aspect of the invention, the milk transporting conduit structure includes at least one milking point that is located between the first and second measurement points. The at least one milking point is connected to the milk transporting conduit structure in such a manner that when the slug passes from the first measurement point to the second measurement point the slug passes through a conduit arrangement of the at least one milking point. Of course, this is desirable because thereby the slug may also clean/rinse any milking points connected to the milk transporting conduit structure According to still another preferred embodiment of this aspect of the invention, the data processor is specifically configured to: receive a distance measure reflecting a length of the milk transporting conduit structure between the first and second measurement points; receive a value of a first registered point in time when the slug is considered to pass the first measurement point; receive a value of a second registered point in time when the slug is considered to pass the second measurement point; and calculate an average velocity of the slug based on the distance measure and the first and second points in time, the average velocity representing the indicator of the at least one quality of the cleaning process. To guarantee a good cleaning result the slug has to move along the milk transporting conduit structure without breaking at the right velocity.

Moreover, according to another preferred embodiment of this aspect of the invention, the sensor arrangement contains a temperature sensor configured to register a temperature level inside the milk transporting conduit structure and repeatedly forward updatings of the registered temperature level to the data processor. The indicator produced by the data processor further comprises graphical data expressing the temperature level inside the milk transporting conduit structure as a function of time. Thereby, temperature fluctuations during the cleaning process may also serve as a basis for evaluating the quality of the process.

According to a further preferred embodiment of this aspect of the invention, the data processor is configured to collect data in respect of at least two slugs, and produce data reflecting at least one characteristics of the at least two slugs on a graphical format representing each of the at least two slugs individually. Such a collective presentation may give the operator a convenient overview of the overall success of a complete cleaning process.

According to yet another preferred embodiment of this aspect of the invention, the sensor arrangement is removably attached to the milk transporting conduit structure. Hence, the sensor arrangement can be set up on demand in connection with executing a scheduled evaluation of the cleaning efficiency. Thereby, there is no additional cost on the milking installation as such due to the proposed system.

According to still another preferred embodiment of this aspect of the invention, the sensor arrangement is configured to repeatedly forward the updatings of the at least one measured parameter to the data processor on a wireless format, and the data processor is configured to receive the repeatedly forwarded the updatings of the at least one measured parameter on the wireless format. Consequently, connecting and installing the proposed analyzing system can be made very straightforward.

According to another aspect of the invention, the object is achieved by the method described initially, wherein the indicator reflects a cross-sectional profile of the slug at at least one position in the milk transporting conduit structure. The method further involves updating, repeatedly, the measurement of the at least one parameter. The advantages of this method, as well as the preferred embodiments thereof, are apparent from the discussion above with reference to the proposed system.

According to a further aspect of the invention the object is achieved by a computer program loadable into the memory of at least one processor, and includes software adapted to implement the method proposed above when said program is run on at least one processor.

According to another aspect of the invention the object is achieved by a processor-readable medium, having a program recorded thereon, where the program is to control at least one processor to perform the method proposed above when the program is loaded into the at least one processor.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
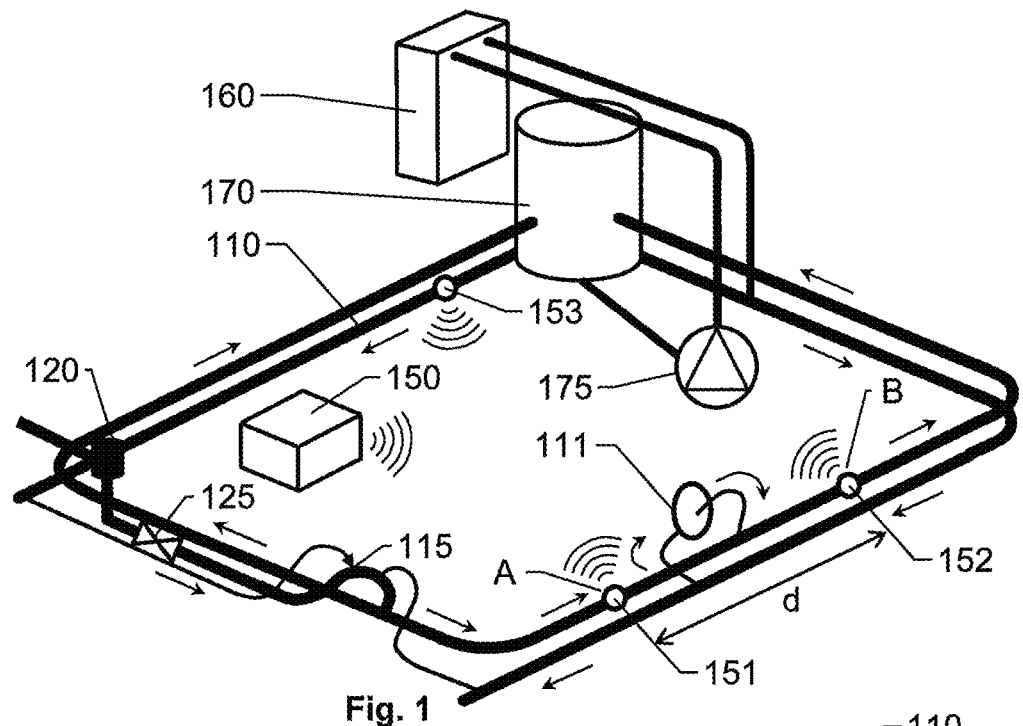
FIG. 1 shows an example of a milking installation to which the invention may be applied.

In FIG. 1, we see a milking installation including a milk transporting conduit structure 110 a milking point 111, a cleaning unit 160, a milk tank 170 and a pump 175, where a proposed analyzing system may be applied in order to evaluate a cleaning process in respect of the milk transporting conduit structure 110.

The proposed system contains a fluid inlet 120, an injector 115, a sensor arrangement 151, 152 and 153 respectively and a data processor 150.

The sensors in sensor arrangement 151, 152 and 153 are preferably removably attached to the milk transporting conduit structure 110. Thus, the proposed system can be connected to an existing milking installation on an on-demand basis.

The fluid inlet 120 is configured to introduce fluid, preferably a well-defined amount, into the milk transporting conduit structure 110. Here, the fluid predominantly contains liquid (e.g. in the form of water or detergent), however the fluid may also include gas bubbles (e.g. containing air).

The injector 115 is configured to introduce an amount of gas (e.g. air) into the milk transporting conduit structure 110, thus producing a temporary pressure increase therein. The temporary pressure increase causes a slug S of fluid to be formed in and forwarded through the milk transporting conduit structure 110.

Figure 2:
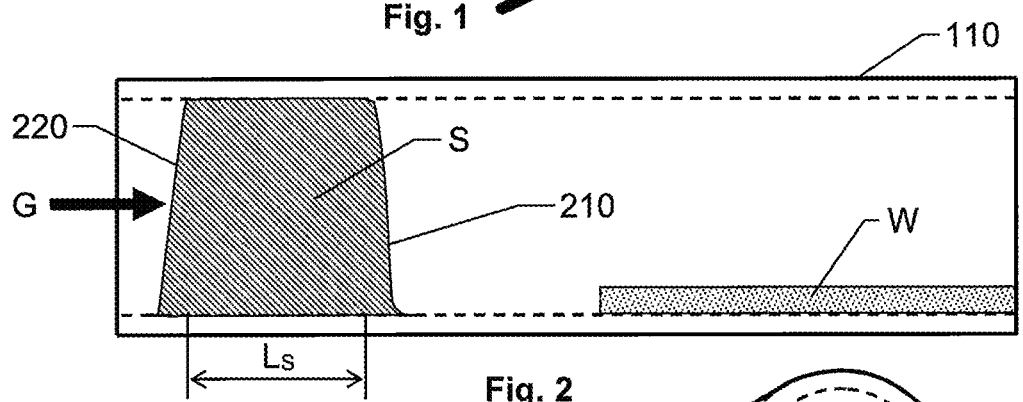
FIG. 2 shows a cross-section view of a milk line illustrating some aspects of a slug of fluid.

FIG. 2 shows a cross-section view of a milk line in the milk transporting conduit structure 110. Here, the slug S is schematically represented as a volume of fluid (e.g. in the form of water or cleaning fluid) that fills the entire cross section of the conduit.

In FIG. 2, we also see a volume of water W on the bottom of the conduit. This water W may have entered via the milking point 111 and/or may remain from a previous phase in the cleaning process. As the slug S progresses through the conduit structure 110, the slug S will mix with the water W and leave a trail of water W behind itself. Provided that the slug S has appropriate properties in terms of volume and velocity in relation to the amount of water W relative to the diameter of the conduit and the travel distance, the slug S will pass comparatively unchanged through the conduit structure 110. At the same time, the slug S will act mechanically (and chemically, if it contains cleaning fluid) on the interior surfaces of the conduit structure 110, thus accomplishing a desired cleaning/rinsing action.

The sensor arrangement 151, 152 and 153 is configured to measure at least one parameter related to the slug S, e.g. a pressure level and/or a temperature level inside the conduit structure 110. The data processor 150 is configured to receive the at least one parameter measured by the sensor arrangement 151, 152 and 153; and based thereon, produce an indicator of at least one quality of the cleaning process. The indicator reflects a cross-sectional profile of the slug S at at least one position A and/or B in the milk transporting conduit structure 110. However, as will be described below, the indicator may also reflect other characteristics of the slug S. In any case, the sensor arrangement 151, 152, and 153 is configured to repeatedly forward updatings of the at least one measured parameter to the data processor 150, say at a frequency of 10 to 10.000 samples per second, preferably around 1.000 samples per second. It is further advantageous if the sensor arrangement 151, 152 and 153 is configured to repeatedly forward the updatings of the at least one measured parameter to the data processor 150 on a wireless format. Correspondingly, in such a case, the data processor 150 is configured to receive the repeatedly forwarded the updatings of the at least one measured parameter on the wireless format. Namely, this provides high flexibility, especially if the sensors in sensor arrangement 151, 152 and 153 are removably attached to the milk transporting conduit structure 110.

As will be apparent from the below, the sensor arrangement preferably includes at least one pressure sensor 151 and 152 that is configured to register a pressure level inside the milk transporting conduit structure 110.

In particular, a first sensor 151 may be configured to measure a first parameter at a first measurement point A in proximity to and downstream of the injector 115 relative to a flow direction for the slug S. The data processor 150 is here configured to produce the indicator based on the first parameter so as to reflect the cross-sectional profile of the slug S at the first measurement point A. Analogously, a second sensor 152 may be configured to measure a second parameter at a second measurement point B downstream of the first measurement point A on the milk transporting conduit structure 110. The data processor 150 is further configured to produce the indicator based on the second parameter so as to reflect the cross-sectional profile of the slug S at the second measurement point B.

Figure 3:
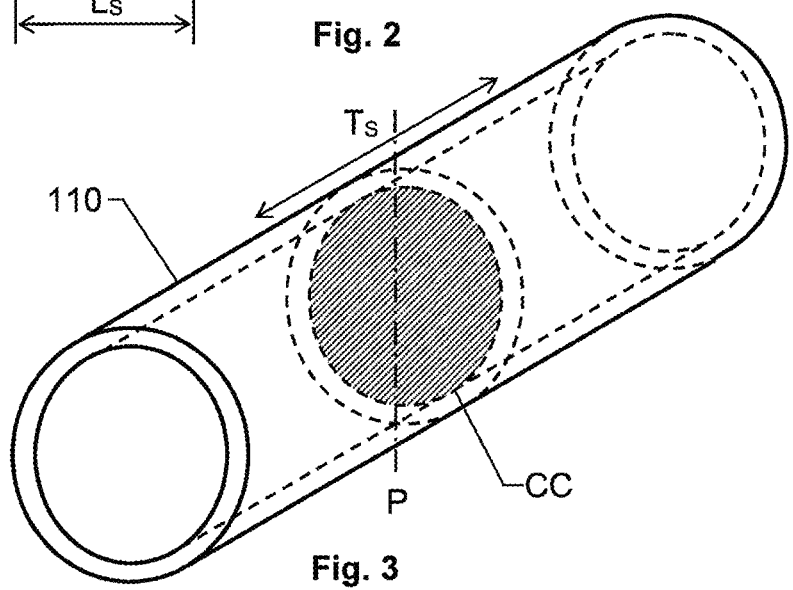
FIG. 3 shows a perspective section view of a milk line illustrating further aspects of the slug.

According to one embodiment of the invention, based on the repeated updatings of the at least one measured parameter, the data processor 150 is configured to determine a cross-sectional length $L_S$ of the slug S and/or an extension in time $T_S$ of the slug S. The cross-sectional length $L_S$ of the slug S is defined as a distance of the milk transporting conduit structure 110 being fully filled by the slug S. Referring to FIG. 3, the extension in time $T_S$ of the slug S is defined as an interval during which the slug S fully fills the cross section CC of the milk transporting conduit structure 110 at a particular position P.

To describe the cross-sectional profile of the slug S at the at least one position A and/or B in the milk transporting conduit structure 110, the indicator produced by the data processor 150 preferably contains graphical data expressing how the slug S is distributed in the milk transporting conduit structure 110 as a function of time $T_S$ or length $L_S$ along the milk transporting conduit structure 110. In other words, the indicator may contain graphic information similar to what is shown in FIG. 2. The length $L_S$ is a useful indicator because a very short slug S may be the result of an inadequate vacuum drop in the milk transporting conduit structure 110.

Figure 4:
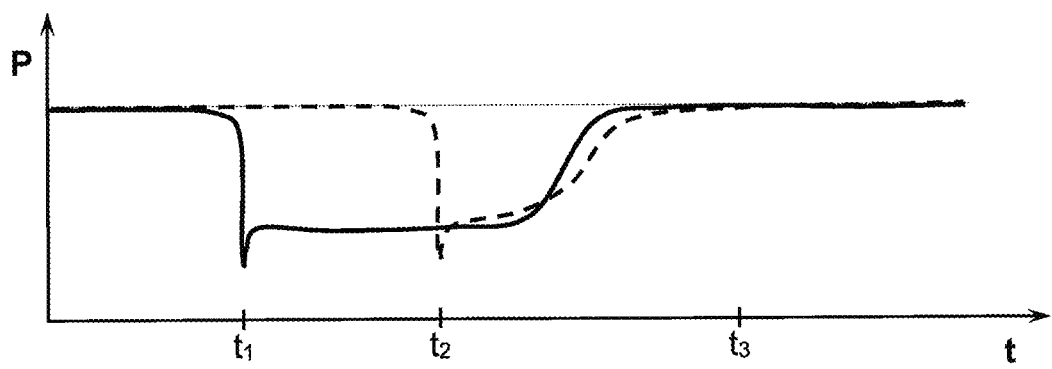
FIGS. 4, 5 illustrate, via graphs, examples of how different parameters may vary over time during a cleaning process.

In FIG. 4, we see an alternative representation of a slug's S characteristics. Here, a bold-line graph illustrates an example of how the vacuum pressure P varies over time t at a first measurement point A where a first pressure sensor 151 of the sensor arrangement is located. As can be seen, the pressure P drops sharply at $t=t_1$. This is due to the fact that the slug S passes the first measurement point A. Here, an inadequate vacuum drop may result in a too short slug S, and be caused by excessive gas in the milk transporting conduit structure 110. Further, a slow-rate vacuum drop may lead to that the slug is fed too slowly through the milk transporting conduit structure 110. This, in turn, may be caused by excessive water W in the milk transporting conduit structure 110 and/or that there are leaks therein.

A dashed-line graph illustrates an example of how the vacuum pressure P varies over time t at a second measurement point B where a second pressure sensor 152 of the sensor arrangement is located. At $t=t_2$, the vacuum pressure P drops sharply as a result of the slug S passing the second measurement point B. Consequently, between $t_1$ and $t_2$, the slug S has travelled from the first measurement point A to the second measurement point B.

To calculate an average velocity of the slug S, the data processor 150 is therefore preferably configured to receive a distance measured reflecting a length of the milk transporting conduit structure 110 between the first and second measurement points A and B; receive a value of a first registered point in time $t_1$ when the slug S is considered to pass the first measurement point A; and receive a value of a second registered point in time $t_2$ when the slug S is considered to pass the second measurement point B. Then, based on the distance measure d and the first and second points in time $t_1$ and $t_2$ respectively. The data processor 150 is configured to calculate the average velocity of the slug S as the indicator of the at least one quality of the cleaning process. Namely, it has been shown that optimal cleaning action is produced by slug velocities of 7 m/s to 10 m/s.

At a later point in time, around $t_3$, the vacuum pressure levels at both the first and second measurement points A and B respectively are reestablished. This is due to that the injector 115 has been cut off. Thus, at any point in time after $t=t_3$ another slug S can be forwarded through the milk transporting conduit structure 110.

For improved control over the cleaning action it is advantageous if the fluid inlet 120 is associated with a controllable valve 125, which is configured to cause a particular amount of fluid to be introduced into the milk transporting conduit structure 110 before the injector 115 introduces the amount of gas G therein. Specifically, for ideal behavior of the slug S in the milk transporting conduit structure 110, and to avoid undesired turbulence and/or energy loss, the cross-sectional length $L_S$ should neither be too short nor too long relative to the diameter of the conduit structure 110. A relationship between the cross-sectional length $L_S$ and the diameter of the conduit structure 110 of 15:1 to 2:1 has been found to provide a good cleaning/rinsing action.

In FIG. 1 one milking point 111 is schematically illustrated on the milk transporting conduit structure 110 between the first and second measurement points A and B. The milking point 111 is connected to the milk transporting conduit structure 110 in such a manner that when the slug S passes from the first measurement point A to the second measurement point B the slug S passes through a conduit arrangement of the milking point 111. Consequently, the slug S also cleans/rinses the one milking point 111.

It is generally advantageous if the proposed sensor arrangement includes a temperature sensor 153. Typically, the temperature sensor 153 is arranged on the outside of the milk transporting conduit structure 110, however, it is configured to register a temperature level T inside the milk transporting conduit structure 110. However, alternatively, or additionally, the temperature sensor 153 can be arranged inside the milk transporting conduit structure 110, for example in the milk tank 170. In any case, the temperature sensor 153 is preferably configured to repeatedly forward updatings of the registered temperature level T to the data processor 150. Namely, to attain adequate cleaning and rinsing, it is important that the temperature level T lies within a respective range during the different phases of the cleaning process. Therefore, preferably, the indicator produced by the data processor 150 contains graphical data expressing how the temperature level T inside the milk transporting conduit structure 110 varies over time t.

Figure 5:
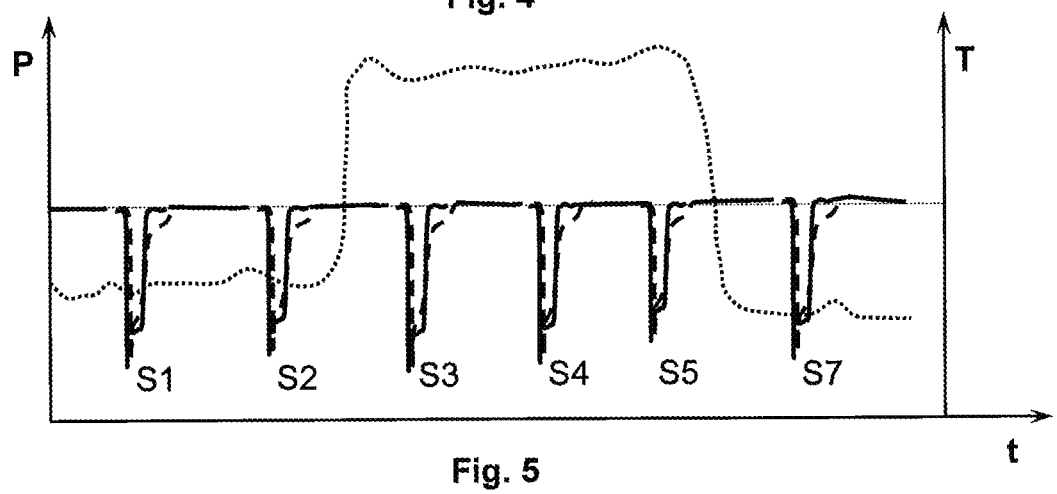

Analogous to the graphs in FIG. 4, FIG. 5 shows bold-line and dashed-line graphs that Illustrate examples of how the vacuum pressure P may vary as a function of time t when a series of slugs S1 to S7 are forwarded from a first measurement point A to a second measurement point B through the milk transporting conduit structure 110. FIG. 5 also shows an example of the temperature level T as a function of time t.

As can be seen, the temperature level T is relatively low (say, in the order of 30-40° C.) when first and second slugs S1 and S2 are forwarded through conduit structure 110. Then, while third, fourth and fifth slugs S3, S4 and S5 are passed there through, the temperature level is relatively high (say, in the order of 70-90° C.). After that, the temperature level T again returns to a relatively low value (say, in the order of 10-20° C.) when a seventh slug S7 is forwarded through conduit structure 110.

A typical cleaning process includes: an initial rinsing phase—a pre-rinse phase—when water is passed through the conduit structure 110 (cf. slugs S1 and S2 above); a following cleaning phase—a main wash phase—when cleaning fluid is passed through the conduit structure 110 (cf. slugs S3 to S5 above); and a final rinsing phase—an after rinse phase—when again water is passed through the conduit structure 110 (cf. slug S7 above).

In the cleaning phases, the cleaning fluid may either contain acid or alkaline; and in a following phase, a sanitizer may also be added. The temperature level T is preferably adjusted depending on the phase of the cleaning process so that the temperature level T matches an operation temperature for the fluid used in the phase in question.

According to one embodiment of the invention, the indicator produced by the data processor 150 contains graphical data equivalent to what is shown in the graphs of FIG. 5. To this aim, the data processor 150 is configured to collect data in respect of at least two slugs S1, S2, S3, S4, S5, S6 and S7; and produce data reflecting at least one characteristics of the at least two slugs S1, S2, S3, S4, S5, S6 and S7 on a graphical format representing each of the at least two slugs S1, S2, S3, S4, S5, S6 and S7 individually.

Returning now to FIG. 2, it is further preferable if the data processor 150 is configured to assign a quality level to the slug S. This measure may be based on a slope criterion with respect to the cross-sectional profile of the slug S at one or more positions in the milk transporting conduit structure 110, for instance the positions A and B. The slope criterion may relate leading edge 210 of the slug S, or a trailing edge 220 of the slug S, or both. Here, a steep slope is generally preferable. In other words, a slew rate below a particular level will result in a low quality level being assigned to the slug, for example indicating "unsuccessful."

It is generally advantageous if the data processor 150 is configured to effect the above-mentioned procedure in a fully automatic manner, for instance by an executing computer program. Therefore, the data processor 150 may be communicatively connected to a memory unit storing a computer program product, which, in turn, contains software for making at least one processor in the data processor execute the above-described actions when the computer program product is run on the at least one processor.

Figure 6:
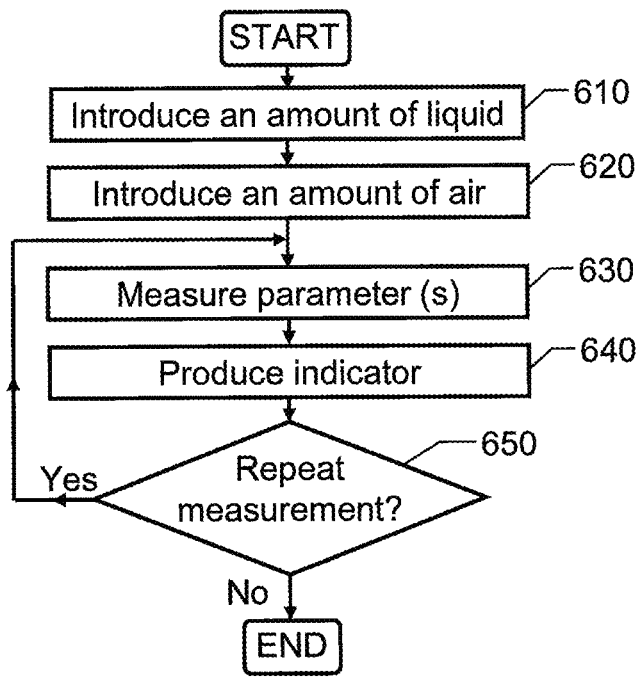
FIG. 6 illustrates, by means of a flow diagram, the general method according to the invention.

In order to sum up, and with reference to the flow diagram in FIG. 6, we will now describe the general method for evaluating a cleaning process in respect of a milk transporting cleaning structure according to the invention.

In a first step 610, an amount of fluid is introduced into the milk transporting conduit structure via a fluid inlet. Then, in a step 620, an amount of gas is introduced into the milk transporting conduit structure via an injector. As a result, the pressure increases temporarily in the milk transporting conduit structure. This, in turn, causes a slug of fluid to be formed in and forwarded through the milk transporting conduit structure.

A step 630 measures at least one parameter related to the slug via a sensor arrangement, and based thereon, a subsequent step 640 produces an indicator of at least one quality of the cleaning process. The indicator reflects a cross-sectional profile of the slug at at least one position in the milk transporting conduit structure.

Thereafter, a step checks if steps 630 and 640 have been traversed a predetermined number of times, say 1000 times per second during an interval of five seconds. If so, the procedure ends; and otherwise, the procedure loops back to step 630.

All of the process steps, as well as any sub-sequence of steps, described with reference to FIG. 6 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An analyzing system for evaluating a cleaning process in respect of a milk transporting conduit structure (110), comprising:
   a fluid inlet (120) configured to introduce fluid into the milk transporting conduit structure (110);
   an injector (115) configured to introduce an amount of gas (G) into the milk transporting conduit structure (110) thus producing a temporary pressure increase therein to cause a slug (S) of fluid to be formed in and forwarded through the milk transporting conduit structure (110);
   a sensor arrangement including first and second pressure sensors configured to register a pressure level inside the milk transporting conduit structure (110), the first and second pressure sensors positioned at a distance (d) from each other along the conduit structure with the first pressure sensor (151) located at a first measurement point (A) in proximity to and downstream of the injector (115) relative to a flow direction for the slug (S) and the second pressure sensor located at a second measurement point (B) downstream of the first measurement point (A) on the milk transporting conduit structure (110); and
   a data processor (150) configured to receive pressure information from the first and second pressure sensors, and based on said pressure information and the distance between the first and second pressure sensors, determine an average velocity of the slug (S) as at least one quality of the cleaning process,
   wherein the pressure information reflects a cross-sectional profile of the slug (S) at respective locations of the first and second pressure sensors in the milk transporting conduit structure (110),
   wherein the sensor arrangement is configured to repeatedly forward updatings of the at least one measured parameter to the data processor (150), and
   wherein the data processor (150) is further configured to:
      receive a distance measure (d) reflecting a length of the milk transporting conduit structure (110) between the first and second measurement points (A; B),
      receive a value of a first registered point in time ($t_1$) when the slug (S) is considered to pass the first measurement point (A),
      receive a value of a second registered point in time ($t_2$) when the slug (S) is considered to pass the second measurement point (B), and
      calculate the average velocity of the slug (S) based on the distance measure (d) and the first and second points in time, the average velocity representing an indicator of the at least one quality of the cleaning process.

2. The analyzing system according to claim 1, wherein the data processor (150) generates graphical data expressing how the slug (S) is distributed in the milk transporting conduit structure (110) as a function of time ($T_S$) or length ($L_S$) along the milk transporting conduit structure (110).

3. The analyzing system according to claim 2, wherein the data processor (150) is configured to, based on repeated received pressure information from the first and second pressure sensors, determine at least one of:
   a cross-sectional length ($L_S$) of the slug (S) defined as a distance of the milk transporting conduit structure (110) being fully filled by the slug (S); and
   an extension in time ($T_S$) of the slug (S) defined as an interval during which the slug (S) fully fills the cross section (CC) of the milk transporting conduit structure (110) at a particular position (P).

4. The analyzing system according to claim 1, wherein the fluid inlet (120) is in communication with a controllable valve (125) configured to cause a particular amount of fluid to be introduced into the milk transporting conduit structure (110) before the injector (115) introduces the amount of gas (G) into the milk transporting conduit structure (110).

5. The analyzing system according to claim 1, wherein the milk transporting conduit structure (110) comprises at least one milking point (111) located between the first and second measurement points (A; B), the at least one milking point (111) being connected to the milk transporting conduit structure (110) in such a manner that when the slug (S) passes from the first measurement point (A) to the second measurement point (B) the slug (S) passes through a conduit arrangement of the at least one milking point (111).

6. The analyzing system according to claim 1, wherein:
the sensor arrangement further comprises a temperature sensor (153) configured to register a temperature level (T) inside the milk transporting conduit structure (110) and repeatedly forward updatings of the registered temperature level (T) to the data processor (150), and
the data processor (150) generates graphical data expressing the temperature level (T) inside the milk transporting conduit structure (110) as a function of time (t).

7. The analyzing system according to claim 1, wherein the data processor (150) is further configured to:
collect data in respect of at least two slugs (S1, S2, S3, S4, S5, S6, S7), and
produce data reflecting at least one characteristic of the at least two slugs (S1, S2, S3, S4, S5, S6, S7) on a graphical format representing each of the at least two slugs (S1, S2, S3, S4, S5, S6, S7) individually.

8. The analyzing system according to claim 1, wherein the data processor (150) is configured to assign a quality level to the slug (S) based on at least one slope criterion with respect to the cross-sectional profile of the slug (S) at at least one of the first measurement point (A) and the second measurement point (B) in the milk transporting conduit structure (110).

9. The analyzing system according to claim 8, wherein the at least one slope criterion relates to at least one of a leading edge (210) and a trailing edge (220) of the slug (S).

10. The analyzing system according to claim 1, wherein the sensor arrangement is removably attached to the milk transporting conduit structure (110).

11. The analyzing system according to claim 1, wherein:
the sensor arrangement is configured to repeatedly transmit pressure information to the data processor (150) wirelessly, and
the data processor (150) is configured to wirelessly receive the repeatedly transmitted pressure information.

12. A method of evaluating a cleaning process of a milk transporting conduit structure (110), the method comprising:
introducing fluid into the milk transporting conduit structure (110) via a fluid inlet (120);
introducing an amount of gas (G) into the milk transporting conduit structure (110) via an injector (115) thus producing a temporary pressure increase therein causing a slug (S) of fluid to be formed in and forwarded through the milk transporting conduit structure (110);
measuring at least one parameter related to the slug via a sensor arrangement that includes first and second pressure sensors configured to register a pressure level inside the milk transporting conduit structure (110), the first and second pressure sensors positioned at a distance from each other along the conduit structure with the first pressure sensor (151) located at a first measurement point (A) in proximity to and downstream of the injector (115) relative to a flow direction for the slug (S) and the second pressure sensor (152) located at a second measurement point (B) downstream of the first measurement point (A) on the milk transporting conduit structure (110); and
determining, by way of a data processor (150) that receives pressure information from the first and second pressure sensors, an average velocity of the slug (S) as an indicator of at least one quality of the cleaning process,
the pressure information reflecting a cross-sectional profile of the slug (S) at respective locations of the first and second pressure sensors in the milk transporting conduit structure (110), and
the measurements of the pressure at the first and second pressure sensors generated repeatedly;
receiving a distance measure (d) reflecting a length of the milk transporting conduit structure (110) between the first and second measurement points (A; B);
receiving a value of a first registered point in time ($t_1$) when the slug (S) is considered to pass the first measurement point (A);
receiving a value of a second registered point in time ($t_2$) when the slug (S) is considered to pass the second measurement point (B); and
calculating the average velocity of the slug (S) based on the distance measure (d) and the first and second points in time, the average velocity representing one indicator of the at least one quality of the cleaning process.

13. The method according to claim 12, wherein the data processor (150) generates graphical data expressing how the slug (S) is distributed in the milk transporting conduit structure (110) as a function of time ($T_S$) or length ($L_S$) along the milk transporting conduit structure (110).

14. The method according to claim 13, further comprising:
determining, based on repeated received pressure information from the first and second pressure sensors, at least one of:
a cross-sectional length ($L_S$) of the slug (S) defined as a distance of the milk transporting conduit structure (110) being fully filled by the slug (S), and
an extension in time ($T_S$) of the slug (S) defined as an interval during which the slug (S) fully fills the cross section (CC) of the milk transporting conduit structure (110) at a particular position (P).

15. The method according to claim 12,
wherein the fluid inlet (120) is in communication with a controllable valve (125), and
wherein the method further comprises:
introducing, via the controllable valve (125), a particular amount of fluid into the milk transporting conduit structure (110) before introducing the amount of gas (G) into the milk transporting conduit structure (110) via the injector (115).

16. The method according to claim 12, further comprising:
registering, repeatedly, a temperature level (T) inside the milk transporting conduit structure (110) via a temperature sensor (153) in the sensor arrangement; and
generating graphical data expressing the temperature level (T) inside the milk transporting conduit structure (110) as a function of time (t).

17. The method according to claim 12, further comprising:
collecting data in respect of at least two slugs (S1, S2, S3, S4, S5, S6, S7); and
producing data reflecting at least one characteristic of the at least two slugs (S1, S2, S3, S4, S5, S6, S7) on a graphical format representing each of the at least two slugs (S1, S2, S3, S4, S5, S6, S7) individually.

18. The method according to claim 12, further comprising:
assigning a quality level to the slug based on at least one slope criterion with respect to the function of time or length along the milk transporting conduit structure (110).

19. The method according to claim 18, wherein the at least one slope criterion relates to at least one of a leading edge (210) and a trailing edge (220) of the slug (S).

20. A computer program recorded on a tangible non-transient computer-readable medium, the computer program loadable into a memory in communication with at least one processor, the computer program comprising software that, upon execution by the at least one processor, causes the at least one processor to carry out the steps of claim 12.

21. An analyzing system for evaluating a cleaning process in respect of a milk transporting conduit structure (110), comprising:
a fluid inlet (120) configured to introduce a fluid into the milk transporting conduit structure (110);
an injector (115) configured to introduce an amount of gas (G) into the milk transporting conduit structure (110) thus producing a temporary pressure increase therein to cause a slug (S) of the fluid to be formed in and forwarded through the milk transporting conduit structure (110);
a sensor arrangement configured to measure at least one parameter related to the slug (S); and
a data processor (150) configured to receive the at least one parameter measured by the sensor arrangement, and based thereon, produce an indicator of at least one quality of the cleaning process,
wherein the indicator produced by the data processor (150) from the at least one measured parameter reflects a cross-sectional profile of the slug (S) at at least one position in the milk transporting conduit structure (110),
wherein the sensor arrangement is configured to repeatedly forward updatings of the at least one measured parameter to the data processor (150), and
wherein the data processor (150) is configured to generate and output a quality level of the slug (S) based on at least one slope criterion of the cross-sectional profile of the slug (S) at the at least one position in the milk transporting conduit structure (110).

22. The analyzing system according to claim 21, wherein the sensor arrangement comprises at least one of any of a pressure sensor, an ultra sound sensor, an electromagnetic sensor, and an optical sensor.

23. The analyzing system according to claim 22, wherein the sensor arrangement includes first and second pressure sensors configured to register a pressure level inside the milk transporting conduit structure (110), the first and second pressure sensors positioned at a distance (d) from each other along the conduit structure.

24. The analyzing system according to claim 21, wherein the at least one slope criterion corresponds to any of a leading edge and a trailing edge of the slug (S).

25. The analyzing system according to claim 24, wherein, where the processor determines that a slew rate based on the at least one slope criterion is below a predetermined level, the processor generates a low quality level for the slug (S).

26. The analyzing system according to claim 21, wherein the updatings occur at a frequency ranging from 10 samples per second to 10,000 samples per second.

27. The analyzing system according to claim 21, wherein the updatings occur at a frequency around 1,000 samples per second.

28. A method of evaluating a cleaning process of a milk transporting conduit structure (110), the method comprising:
introducing fluid into the milk transporting conduit structure (110) via a fluid inlet (120);
introducing an amount of gas (G) into the milk transporting conduit structure (110) via an injector (115) thus producing a temporary pressure increase therein causing a slug (S) of fluid to be formed in and forwarded through the milk transporting conduit structure (110);
measuring at least one parameter related to the slug via a sensor arrangement;
determining, by way of a data processor (150) that receives the at least one parameter measured by the sensor arrangement, an indicator of at least one quality of the cleaning process based on the at least one parameter,
the indicator reflecting a cross-sectional profile of the slug (S) at at least one position in the milk transporting conduit structure (110), and
the method including updating, repeatedly, the measurement of the at least one parameter; and
generating and outputting, by way of the data processor (150), a quality level of the slug (S) based on at least one slope criterion with respect to a function of either of time or length along the milk transporting conduit structure (110).

29. The analyzing system according to claim 28, wherein the sensor arrangement comprises at least one of any of a pressure sensor, an ultra sound sensor, an electromagnetic sensor, and an optical sensor.

30. The analyzing system according to claim 29, wherein the sensor arrangement includes first and second pressure sensors configured to register a pressure level inside the milk transporting conduit structure (110), the first and second pressure sensors positioned at a distance (d) from each other along the conduit structure.

31. The analyzing system according to claim 28, wherein the at least one slope criterion corresponds to any of a leading edge and a trailing edge of the slug (S).

32. The analyzing system according to claim 31, further comprising:
generating, by way of the data processor (150), a low quality level for the slug (S) upon a determination by the data processor (150) that a slew rate based on the at least one slope criterion is below a predetermined level.

33. The analyzing system according to claim 28, wherein the measurement of the at least one parameter is repeated at a frequency ranging from 10 to 10,000 samples per second.

34. The analyzing system according to claim 28, wherein the measurement of the at least one parameter is repeated at a frequency around 1,000 samples per second.

* * * * *